United States Patent
Aust (10) Patent No.: US 9,973,247 B2
(45) Date of Patent: May 15, 2018

(54) WIRELESS COMMUNICATION SYSTEM (71) Applicant: NEC Communication Systems, Ltd, Tokyo (JP)

(72) Inventor: Stefan Aust, Tokyo (JP)

(73) Assignee: NEC Communication Systems, Ltd., Tokyo (JP)

( * ) Notice: Subject to any disclaimer, the term of this patent is extended or adjusted under 35 U.S.C. 154(b) by 0 days. days.

(21) Appl. No.: 15/310,949

(22) PCT Filed: May 23, 2014

(86) PCT No.: PCT/JP2014/064555
§ 371 (c)(1),
(2) Date: Nov. 14, 2016

(87) PCT Pub. No.: WO2015/177936
PCT Pub. Date: Nov. 26, 2015

(65) Prior Publication Data
US 2017/0093470 A1    Mar. 30, 2017

(51) Int. Cl.
*H04B 7/02* (2018.01)
*H04B 7/0456* (2017.01)

(52) U.S. Cl.
CPC .................. *H04B 7/0456* (2013.01)

(58) Field of Classification Search
CPC ..... H04L 1/0618; H04L 1/06; H04L 25/0204; H04L 27/2647; H04L 5/0007;
(Continued)

(56) References Cited

U.S. PATENT DOCUMENTS 8,306,146 B2   11/2012   Heath, Jr. et al.
8,953,707 B2    2/2015   Ro et al.
(Continued)

FOREIGN PATENT DOCUMENTS

CN         103944687 A       7/2014
WO    WO-2009/132601 A1     11/2009

OTHER PUBLICATIONS

T. Inoue and R. W. Heath Jr., "Kerdock codes for limited feedback MIMO systems," Mar. 30-Apr. 4, 2008, Proc. of the IEEE Int. Conf. on Acoustics, Speech, and Signal Proc., Las Vegas, Nev.*
(Continued)

*Primary Examiner* — Zewdu Kassa
(74) *Attorney, Agent, or Firm* — Wilmer Cutler Pickering Hale and Dorr LLP (57) ABSTRACT

The solution of the present invention is a precoding that allows an optimal use of multiple-antennas in a MIMO system. The precoding uses codebooks that are optimized for long-range wireless transmissions. A modified Kerdock codebook $\{w^{km}_i\}$ allows further improvement of the precoding gain. The modified Kerdock codebook $\{w^{km}_i\}$ contains new codewords $w^{km}_i$ that have been modified in order to further improve the transmit bit error rate (BER). The modified codebook $\{w^{km}_i\}$ allows a precoding gain that is between 2-3 dB. The present invention improves the transmit bit error rate (BER) of a wireless system. It allows a longer range in outdoor MIMO systems. Less signal outage is the result which allows that wireless signals can be transmitted over several kilometers.

4 Claims, 12 Drawing Sheets

(58) Field of Classification Search
CPC ............ H04L 27/2657; H04L 27/2662; H04L 5/0048; H04L 25/4902; H04L 1/0009; H04L 1/0041; H04L 25/49; H04B 7/0417; H04B 7/0669; H04B 3/54
USPC ................ 375/267, 260, 259, 316, 295, 219
See application file for complete search history.

(56) References Cited

U.S. PATENT DOCUMENTS

2009/0274230 A1* 11/2009 Heath, Jr. ............ H04B 7/0634
375/260
2013/0064315 A1* 3/2013 Heath, Jr. ............... C23C 14/04
375/260

OTHER PUBLICATIONS

International Search Report corresponding to PCT/JP2014/064555, 3 pages, dated Aug. 5, 2014.

T. Inoue and R. W. Heath Jr., "Kerdock codes for limited feedback precoded MIMO systems," IEEE Transactions on Signal Processing, vol. 57, No. 9, pp. 3711-3716, Sep. 2009.

Vinay Uday Prabhu, Sotiris Karachontzitis, Dimitris Toumpakaris, "Performance Comparison of Limited Feedback Codebook-Based Downlink Beamforming Schemes for Distributed Antenna Systems" Wireless VITAE 2009, pp. 171-176, May 2009.

Japanese Decision to Grant a Patent issued in Japanese Patent Application No. 2016-568071, dated Sep. 5, 2017, 6 pages.

Mouncef Benmimoune, et al. "Multi-User MIMO Precoding with Kerdock Codebook," 2010 IEEE, ISWCS 2010 and 2010 7th International Symposium on 2010, pp. 71-75 (5 pages).

Renesas Electronics Europe, Nokia Siemens Networks, Nokia, "Initial System Level Simulation Results on Closed Loop Transmit Diversity with LMMSE Receiver and ISD of 2800 m," 3GPP TSG-RAN WG1 Meeting #63bis, R1-110183, Dublin, Ireland, Jan. 17-21, 2011, pp. 1-7 (7 pages).

* cited by examiner

WIRELESS COMMUNICATION SYSTEM

CROSS-REFERENCE TO RELATED APPLICATIONS

This application is a national stage application of International Application No. PCT/JP2014-064555 entitled "WIRELESS COMMUNICATION SYSTEM," filed on May 23, 2014 the disclosure of which is hereby incorporated by reference in its entirety.

TECHNICAL FIELD

The present invention relates to a wireless communication system. Specifically, the present invention relates to a MIMO (multiple-input-multiple-output) communication system using "precoding".

BACKGROUND ART

Precoding schemes are widely used in multiple-input multiple-output (MIMO) wireless systems. The precoded data achieves higher transmission reliability when transmitted via wireless channel, due to the coding distance between the signals. The receiver is able to correct transmission errors when precoding is applied. Further, precoding in multi-antenna systems allow to send the data stream to multiple antennas concurrently.

Some codebook designs have been reported, which codebooks are designed based on, for example, Grassmannian manifold, vector quantization, Fourier transform and Kerdock manifold.

When we take it in a simple way, it could be said that the Grassmannian codebook design based on the Grassmannian manifold is substantially superior, because of a large distance between codewords. The Grassmannian codebook $W^g(k)$ is optimal for selecting codewords $w^g(i)$ with a maximum codeword distance $d_w$. Here we show one example of the Grassmannian codebook which is suitable for 2×2 wireless communication system; 2 antennas at a transmission side and 2 antennas at a receiver side.

$$w_0^g = \begin{bmatrix} -0.1612 - j0.7348 & -0.5135 - j0.4128 \\ -0.0787 - j0.3192 & -0.2506 + j0.9106 \end{bmatrix} \quad \text{[Equation 1]}$$

$$w_1^g = \begin{bmatrix} -0.2399 + j0.5985 & -0.7641 - j0.0212 \\ -0.9541 & 0.2996 \end{bmatrix}$$

Currently, the MIMO wireless communication system, for example, IEEE802.11, what has been referred to as Wi-Fi, is optimized for indoor usage. Indoor environments are typically characterized by significant multi-path propagation between sender and receiver due to reflections and attenuation by various obstacles, for example, walls, furniture, windows, mirrors, etc. Since the Grassmannian codebook $W^g(k)$ is optimal for selecting codewords $w^g(i)$ with a maximum codeword distance $d_w$, we can say that it is one of the best design choices.

However, a problem of the Grassmannian codebook lies in a significant large computational overhead because the codewords of Grassmannian manifold have a large number of digits. More specifically, a large number of digits generate a large number of multiplications, which requires a big overhead in signal processing and leads to additional processing time, thus increasing the latency in an entire communication system. As high speed and large capacity communication is now required, the Grassmannian codebook which requires longer processing time needs some alternative precoding scheme.

Kerdock codebook design which is based on Kerdock manifold therefore provides one prospective answer, because of its complexity reduction. Here we show one example of the Kerdock codebook which is suitable for a 2×2 wireless communication system.

$$w_0^k = \frac{1}{\sqrt{2}} \begin{bmatrix} 1 & 1 \\ 1 & -1 \end{bmatrix} \quad \text{[Equation 2]}$$

$$w_1^k = \frac{1}{\sqrt{2}} \begin{bmatrix} 1 & 1 \\ j & -j \end{bmatrix}$$

Surely, taking the Kerdock codebook, each element of each codeword is fairly simple, which reduces storage and search requirements. In addition, according to NPTL 1 and PTL 1, system performance is approximately same between the Grassmannian codebook design and the Kerdock codebook design. It is because less channel state information (CSI) feedback is required for the Kerdock codebook, so it reduces the feedback overhead which otherwise would interfere with the data traffic. Therefore the Kerdock codebook leads to high performance comparable or better than previously known codebooks.

CITATION LIST

Patent Literature

PTL 1: U.S. Pat. No. 8,306,146

Non Patent Literature

NPL 1: T. Inoue and R. W. Heath Jr., "Kerdock codes for limited feedback precoded MIMO systems," IEEE Transactions on Signal Processing, vol. 57, no. 9, pp. 3711-3716, 2009.

SUMMARY OF INVENTION

Technical Problem

Figure 10:
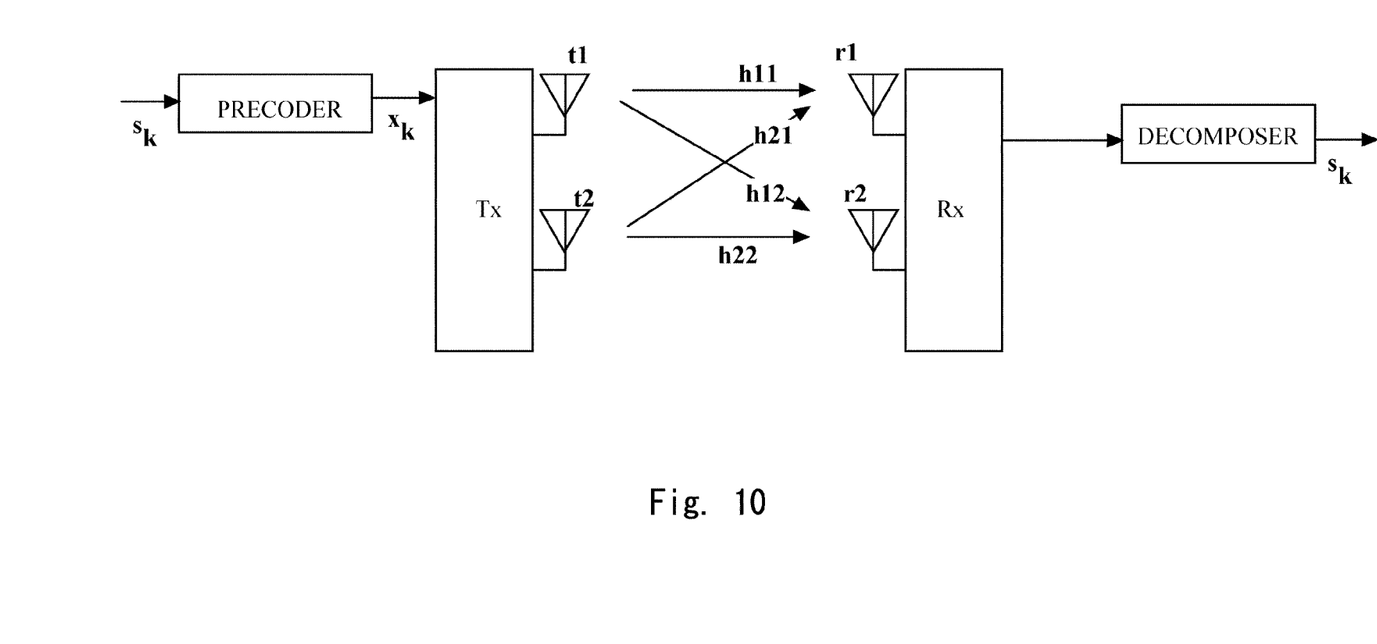
FIG. 10 shows a simulation model with channel matrix H.

Through earnest and thorough research, we inventors of the present invention have found a key problem set forth below. We repeatedly carried out simulation experiments based on channel modeling and examined results thereof in detail. FIG. 10 shows a simulation model with channel matrix H in which 2×2 wireless communication system was adopted.

Figure 11:
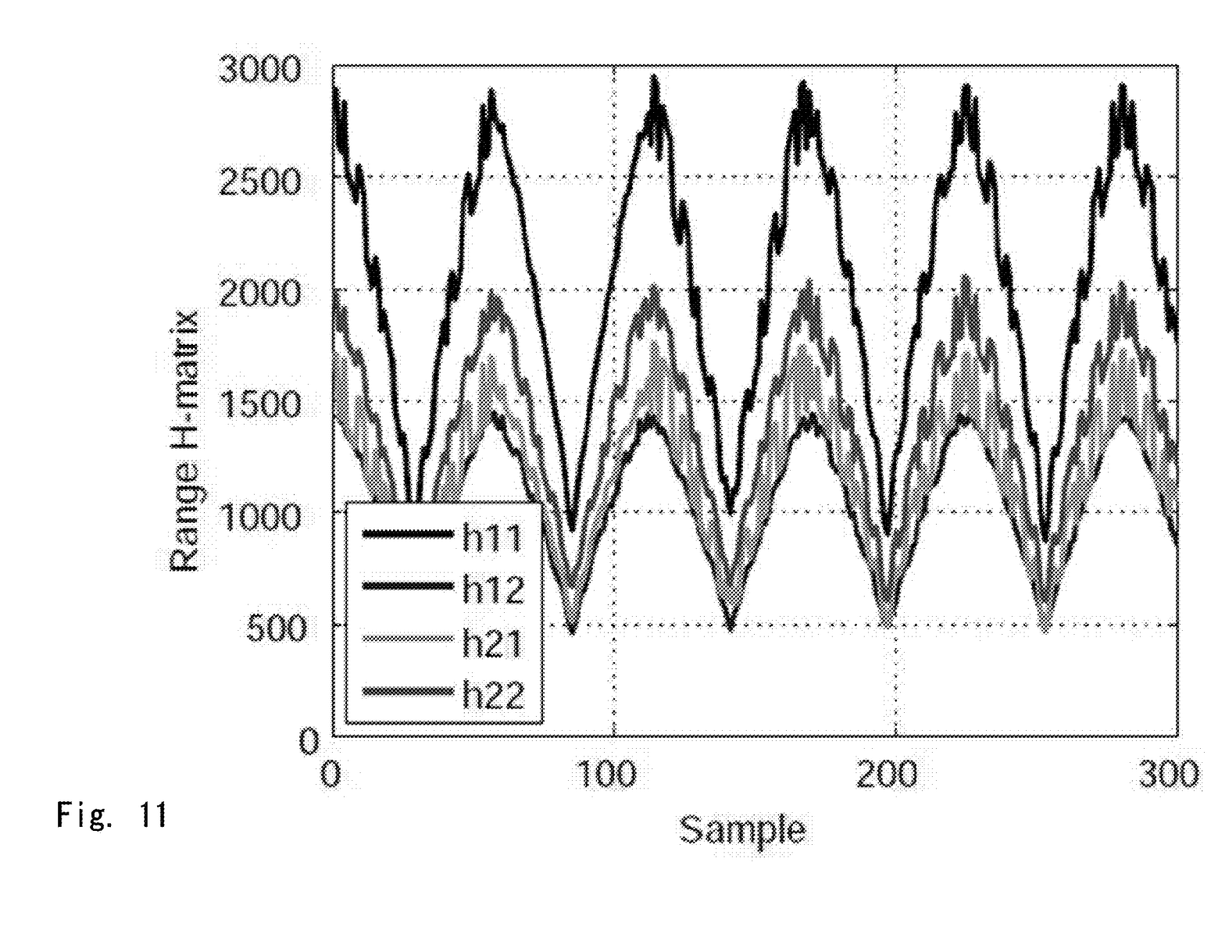
FIG. 11 shows CSI (channel state information) parameter observed when using the Grassmannian codebook as a precoder.
Figure 12:
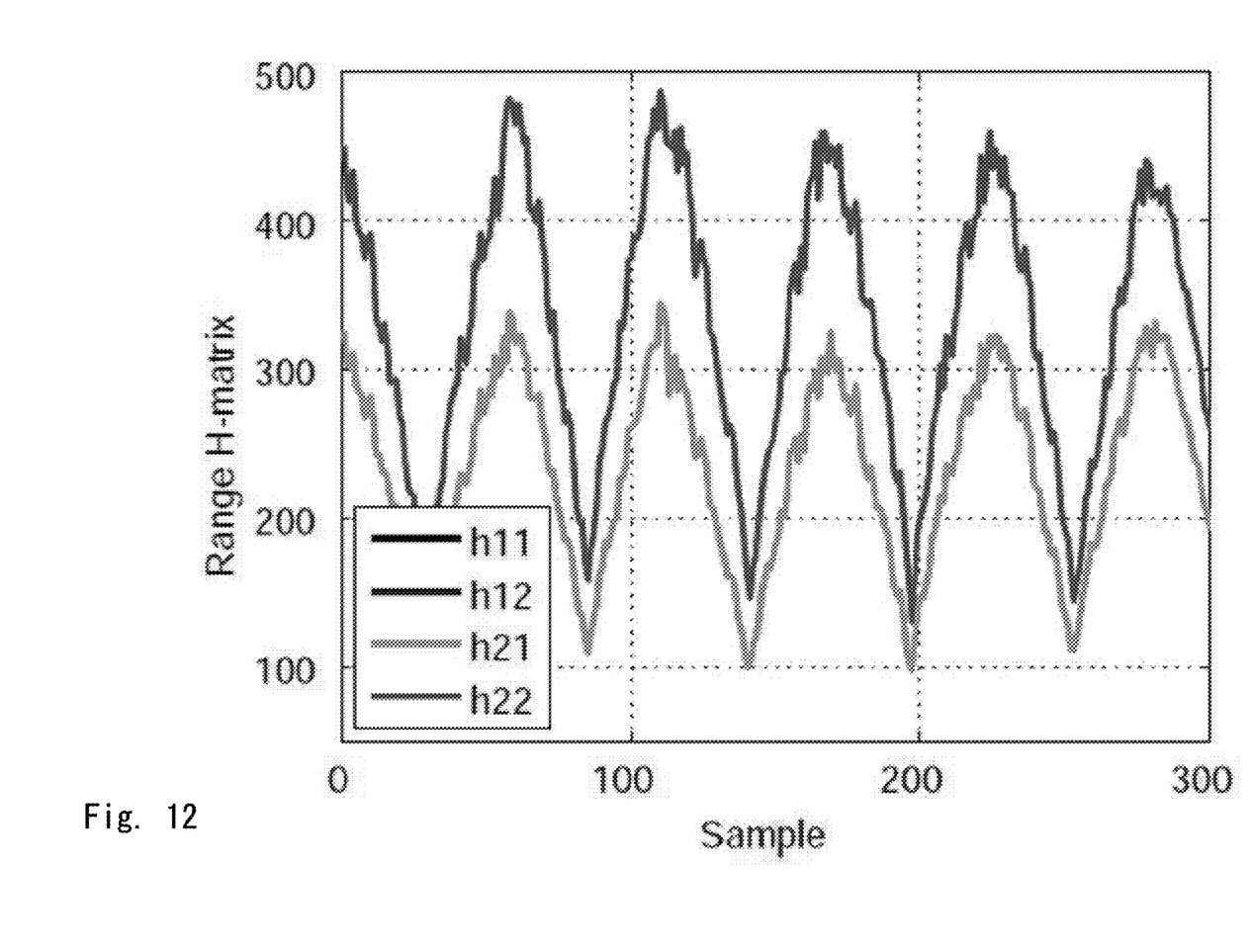
FIG. 12 shows CSI parameter observed when using the Kerdock codebook.

We show the result of the experiments in FIG. 11 and FIG. 12. FIG. 11 shows CSI (channel state information) parameter observed when using the Grassmannian codebook as a precoder and FIG. 12 shows CSI parameter observed when using the Kerdock codebook.

Firstly, as is shown in FIG. 11, we show that the Grassmannian codebook utilizes all channel state information (CSI). That is, when using the Grassmannian codebook design, experimental results shows a 2×2 matrix with 4 channel state parameters h11, h12, h21, and h22 which differ from each other.

Next, the observed CSI parameter of the Kerdock codebook is shown in FIG. 12. From the result shown in FIG. 12, we found that, when Kerdock codebook is applied as a precoder, the utilized CSI parameters are reduced by the factor 2. That is, the other 2 CSI parameters report the same channel state, thus do not contain additional information, and as such are redundant.

The experimental results reveal that when applying the Kerdock codebook as a precoder a significant degeneration of channel state information is the result. Significant CSI information data in a MIMO system are lost without being effectively utilized.

As it was mentioned earlier, current precoding schemes are optimized in order to improve MIMO systems so that increased data rate can be achieved in indoor environments. Selected precoding codebooks as of now only consider optimization in regard to data rate and network throughput. However, in foreseeable future, the wireless coverage needs to be improved in order to allow wider access. Wider access is referred to hundreds of meters up to several kilometers. Therefore codebook schemes should improve the signal outage over a large distance, for instance in long-range MIMO systems, with a coverage range of several kilometers.

An object of the present invention is to provide a MIMO (multiple-input-multiple-output) communication system using new set of codebook design as a precoder which enables long-range MIMO systems in indoor and outdoor environments.

Solution to Problem

The present invention improves the transmit bit error rate (BER) of a wireless system. It allows, for example, a longer range in outdoor MIMO systems. Less signal outage is the result which allows that wireless signals can be transmitted over several kilometers. The solution is a precoding that allows an optimal use of multiple-antennas in a MIMO system. The precoding uses codebooks that are optimized for long-range wireless transmissions. A modified Kerdock codebook $\{w^{km}_i\}$ allows further improvement of the precoding gain. The modified Kerdock codebook $\{w^{km}_i\}$ contains new codewords $w^{km}_i$ that have been modified in order to further improve the transmit bit error rate (BER). The modified codebook $\{w^{km}_i\}$ allows a precoding gain that is between 2-3 dB.

DESCRIPTION OF EMBODIMENTS (Core Idea)

The present invention improves performance of codebook-based wireless communication systems, which result in long range MIMO systems. The core idea of the present invention is to provide a new set of codewords as a precoder, in which the positive feature of the Grassmannian codebook and the Kerdock codebook are fully utilized. We the inventors here propose modifications of Kerdock codewords which utilizes all CSI parameters effectively. The present invention uses the following modified Kerdock codewords $w^{km}(i)$;

$$w^{km}_0 = \frac{1}{\sqrt{2}}\begin{bmatrix} 1 & 1 \\ 1 & -1 \end{bmatrix}$$

$$w^{km}_1 = \frac{1}{\sqrt{2}}\begin{bmatrix} 1 & 1+j \\ 1+j & 1-j \end{bmatrix}$$

[Equation 3]

The above set of codewords has been found out through earnest and thorough research. Therefore, though repeated experiments proved its beneficial effect clearly, it is not known exactly why the modification works effectively. However, we would like to point out unassumingly one possibility. When you compare the (unmodified) Kerdock codeword $w^k_1$ and the modified Kerdock codeword $w^{km}_1$, the elements of the first row of the $w^k_1$ are identical (both "1"), but the counterpart elements of the $w^{km}_1$ are different each other. This may be associated with the improvement of BER.

We would like to add one more word. We have proposed 2×2 matrix codewords as elements of the modified Kerdock codebook which is applicable for 2×2 wireless communication system; 2 antennas at a transmission side and 2 antennas at a receiver side. Regarding modification applicable for 3×3, 4×4 or other patterns (e.g. 4×2), though not yet achieved, they are now under investigation and forthcoming in near future.

Figure 1:
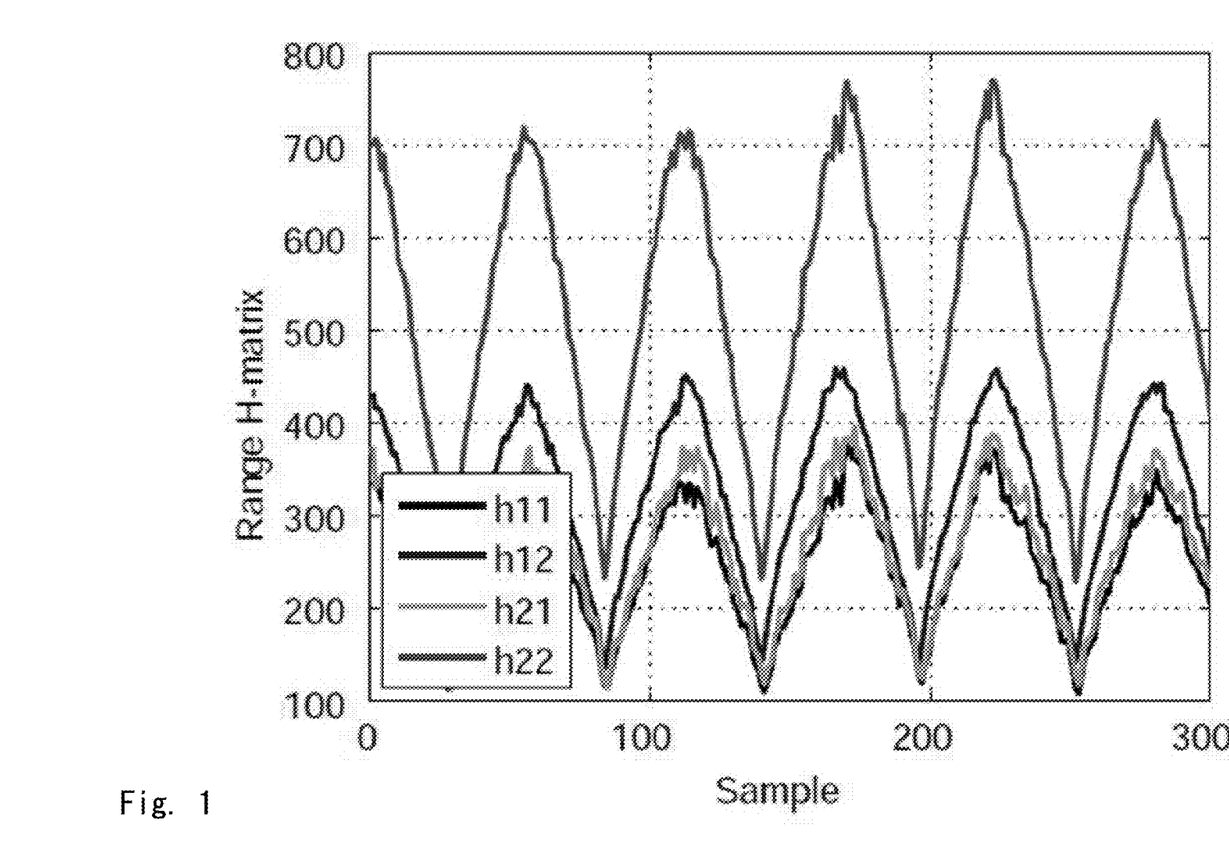
FIG. 1 shows CSI parameters observed when the modified Kerdock codebook is applied as a precoder.

FIG. 1 shows CSI parameters observed when the modified Kerdock codebook is applied as a precoder. In the case that the modified Kerdock codebook is used, all four CSI parameters are utilized and contain channel state information. The perturbations of four CSI parameters are detectable with the modified Kerdock, which is critically beneficial for optimizing the MIMO communication among the sender and receiver.

A First Embodiment

Figure 2:
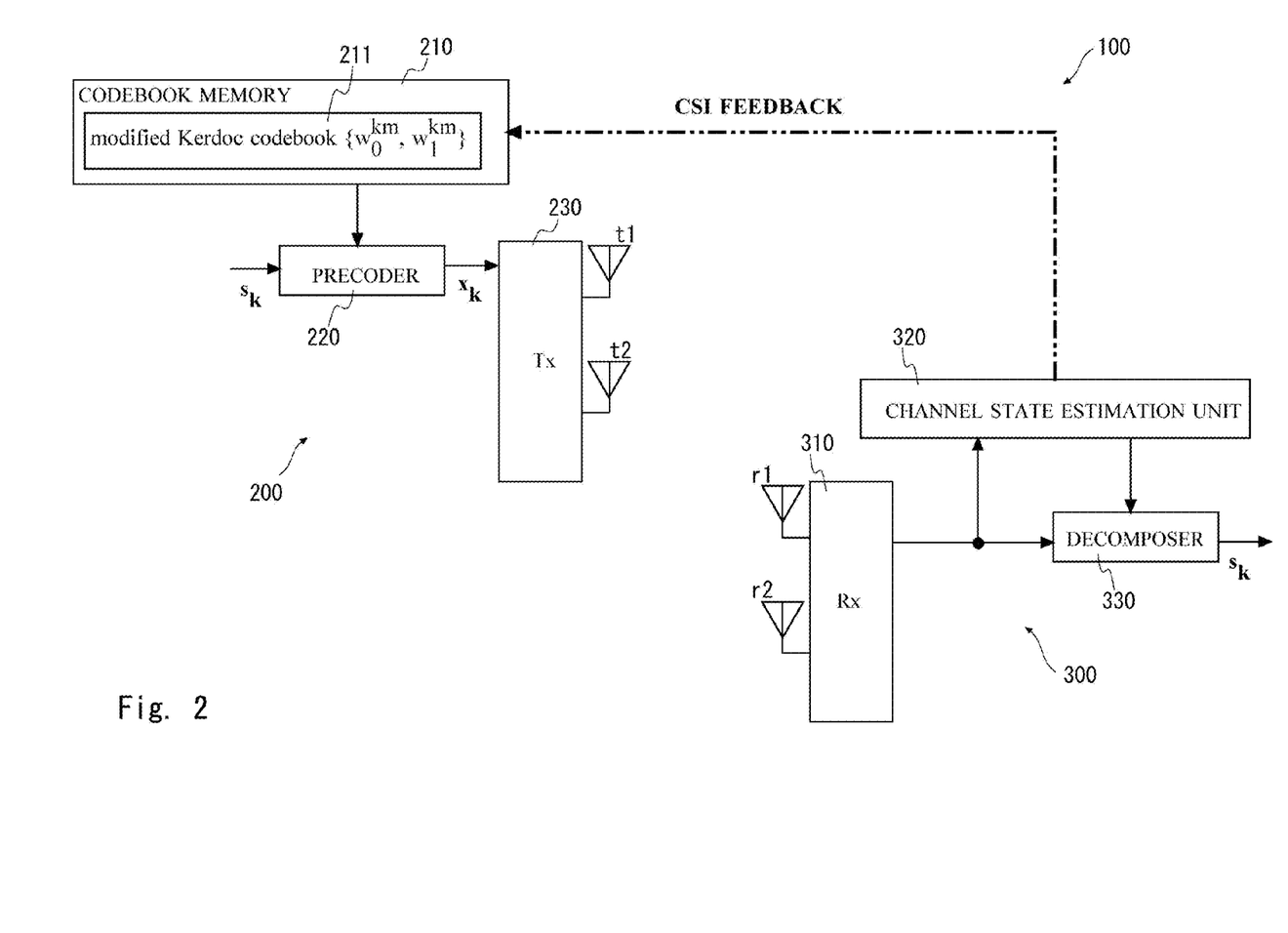
FIG. 2 illustrates a first embodiment of a wireless communication system.
Figure 3:
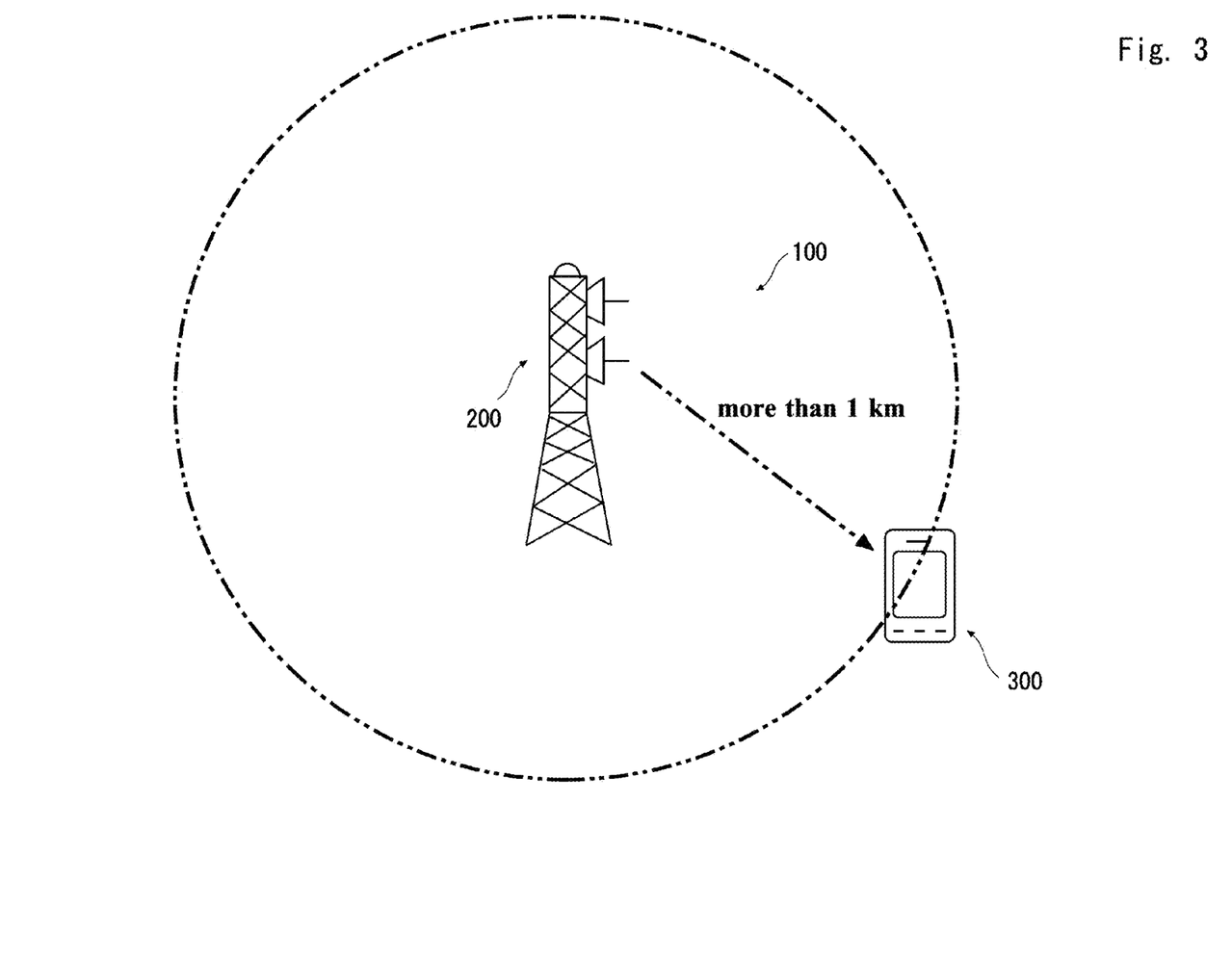
FIG. 3 shows a wireless base station as a transmitter and a wireless mobile station as a receiver.

FIG. 2 illustrates a first embodiment of a wireless communication system 100 having a transmitter 200 and a receiver 300. In this embodiment, we suppose this wireless communication system 100 is used outside. Here assuming a downlink as shown in FIG. 3, the transmitter 200 is, for example, a wireless access point or a wireless base station, and the receiver 300 is, for example, a wireless mobile station. Due to the improvement of BER, as we will discuss later, a distance between the transmitter 200 and the receiver 300 could be several hundred meters or several kilometers (e.g. 500 m, 800 m 1 km or further), which results in an increased number of wireless mobile stations (300) which are in one-hop reach to the base station (200).

The transmitter 200 has a codebook memory 210, a precoder 220 and a transmitting circuit 230. The codebook memory 210 stores a prepared codebook 211. In this embodiment, the codebook memory 210 stores the codewords ($w^{km}_0$, $w^{km}_1$) of the modified Kerdock codebook 211.

The precoder 220 executes matrix multiplication of signals to be sent and the selected codeword. The codeword is selected based on a CSI feedback from the receiver (as we describe later). Signals [$s_k$] to be sent are input to the precoder 220 in which the signals [$s_k$] are precoded by matrix multiplication with the selected codeword $w^{km}_i$.

Precoded signals $x_k(=w^{km}_i \times s_k)$ are output to the transmitting circuit 230 which has two antennas t1, t2, and the transmitting circuit 230 transmits the precoded signal $x_k$ from the antennas t1, t2.

The receiver 300 has a receiving circuit 310, a channel state estimation unit 320 and a decomposer 330. The receiving circuit 310 has two antennas r1, r2 and receives the transmitted data from the transmitter 200. The received data by the receiving circuit 310 is sent to the channel state estimation unit 320 and the decomposer 330.

The channel state estimation unit 320 calculates and estimates the channel state based on the received data, and searches for which codeword is the most suitable for the current (estimated) channel state. The method of the calculation and estimation of channel state information (CSI) has been well known, so we here spare the detail of it. After specifying the most suitable codeword, the channel state estimation unit 320 feedbacks to the transmitter 200 the index number of it as a CSI feedback signal.

The decomposer 330 processes the received data. The decomposer 330, for example, decomposes the signal based on the used codeword, and does decoding and error correction. Thus processed signal $s_k$ is sent to a signal processor.

Figure 4:
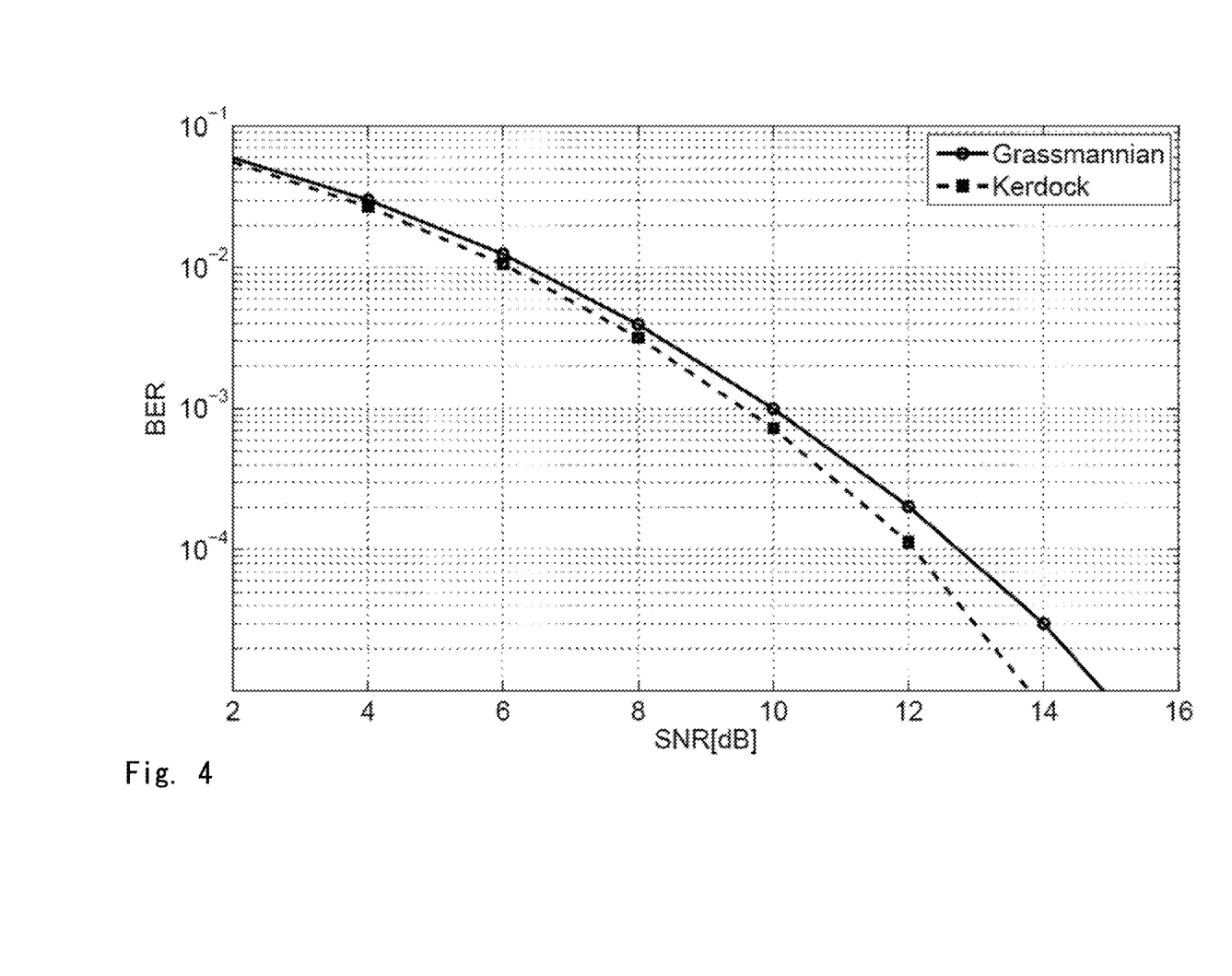
FIG. 4 shows the bit error performance (BER) of the Grassmannian codebook and the (unmodified) Kerdock codebook.
Figure 5:
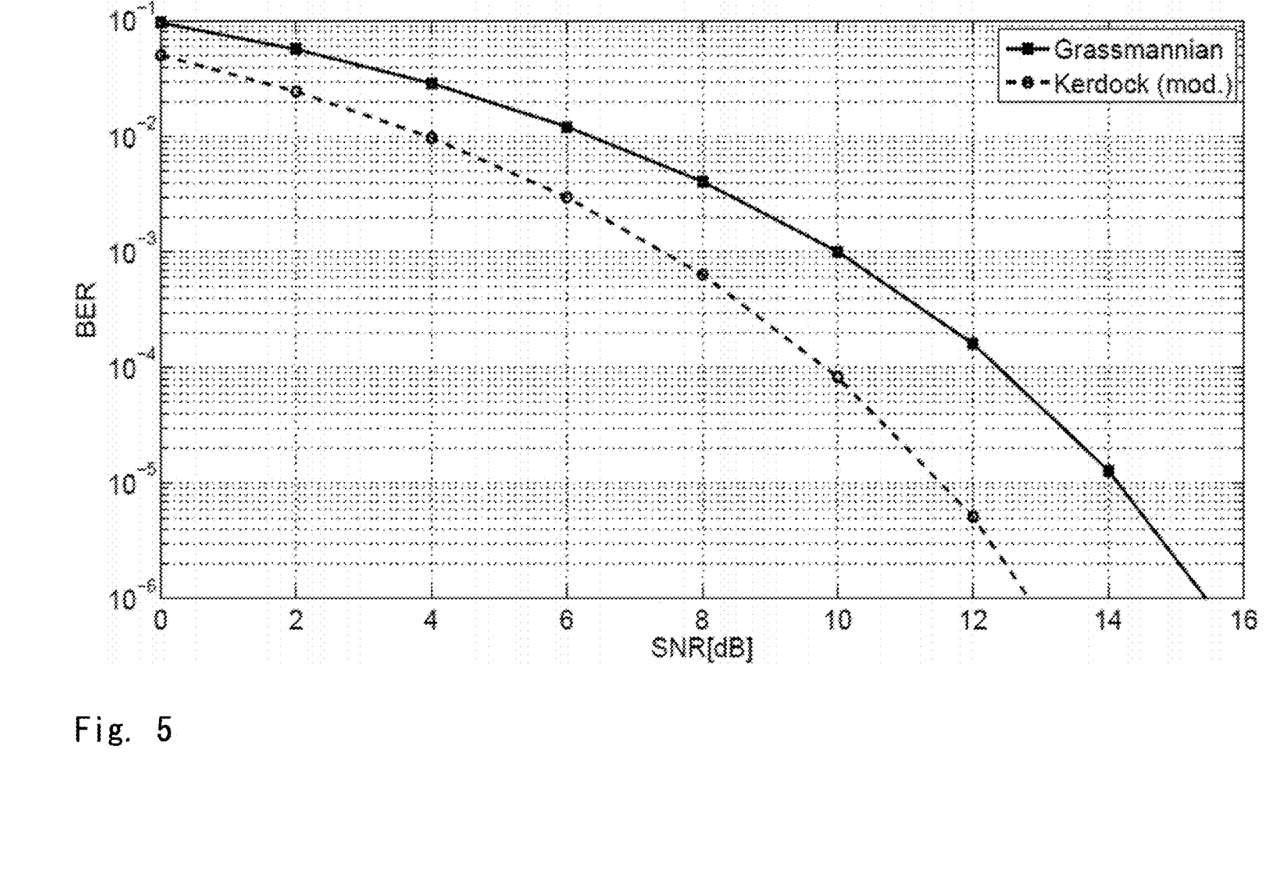
FIG. 5 shows the bit error performance (BER) of the Grassmannian codebook and the modified Kerdock codebook.

Next, we would like to illustrate the effect of the embodiment which employs the modified Kerdock codebook. FIG. 4 and FIG. 5 show the bit error performance (BER) of the Grassmannian codebook, the (unmodified) Kerdock codebook and the modified Kerdock codebook. These results are obtained by simulation studies.

Listed below are simulation parameters (Matlab) used for precoding evaluation.

| | |
|---|---|
| packet size | N_packet = 10 |
| frame size | N_frame = 100000 |
| modulation order | mod_order = 5 |
| SNR value | SNRdBs = [0:2:30] |
| noise variance | Noise_val = 0.5 |
| number of transmit antennas | TT_TX = 2 |
| number of receive antennas | TT_NR = 2 |

As shown in FIG. 5, for example, at BER being $10^{-5}$, a significant gain improvement of >2 dB is the result when the modified Kerdock codebook is applied compared to the Grassmannian codebook. Also, compared the (unmodified) Kerdock codebook, the modified Kerdock codebook show more than 1 dB performance improvement, as shown in FIG. 4. Therefore these studies showed that 2-3 dB of performance improvement could be expected when using this embodiment. 2-3 dB corresponds to approximately 50% of BER performance improvement, for your reference.

Figure 6:
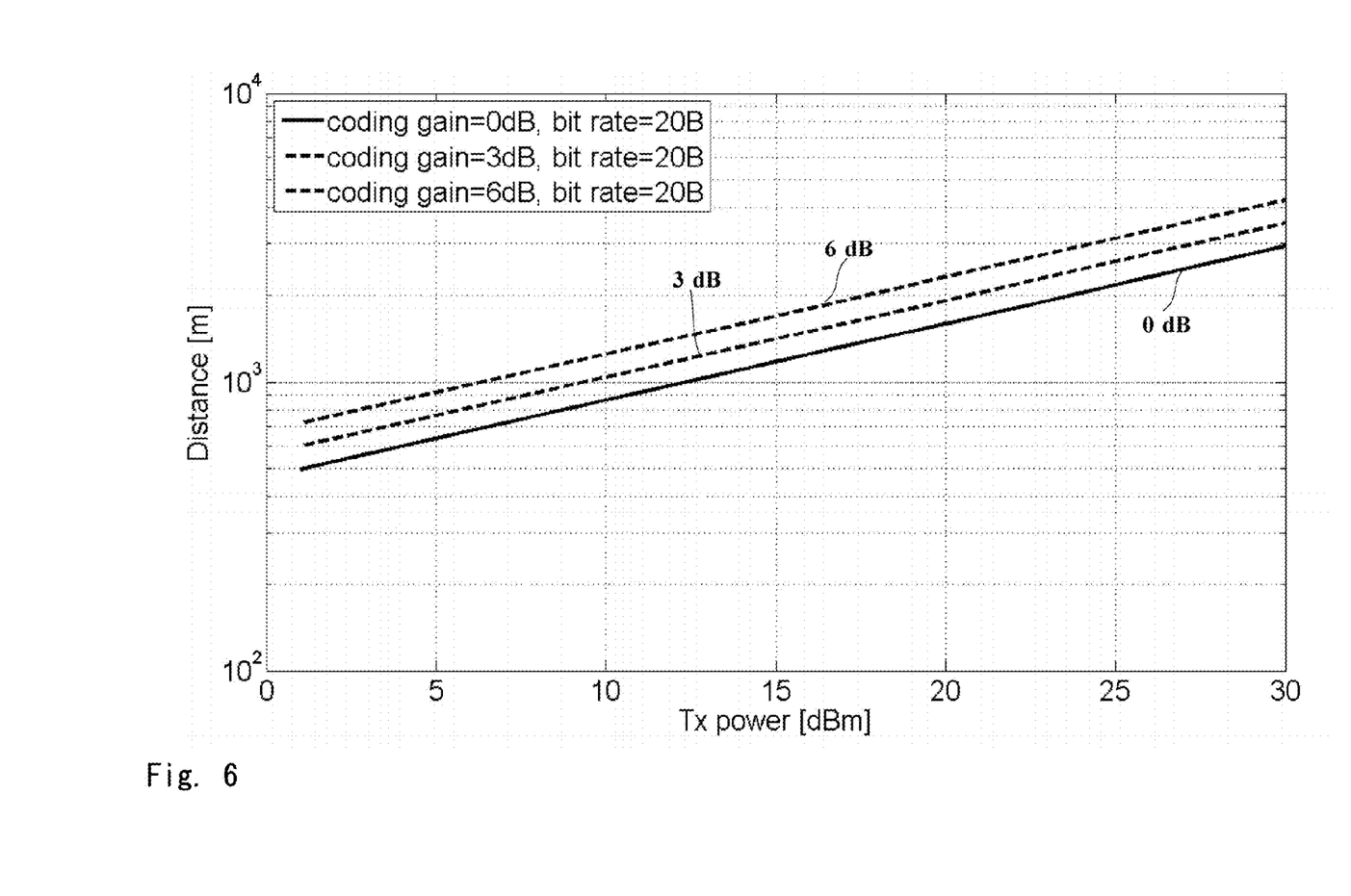
FIG. 6 shows the simulation results on transmission power vs distance (Tx-Rx) for different coding gains (0, 3, 6 dB)
Figure 7:
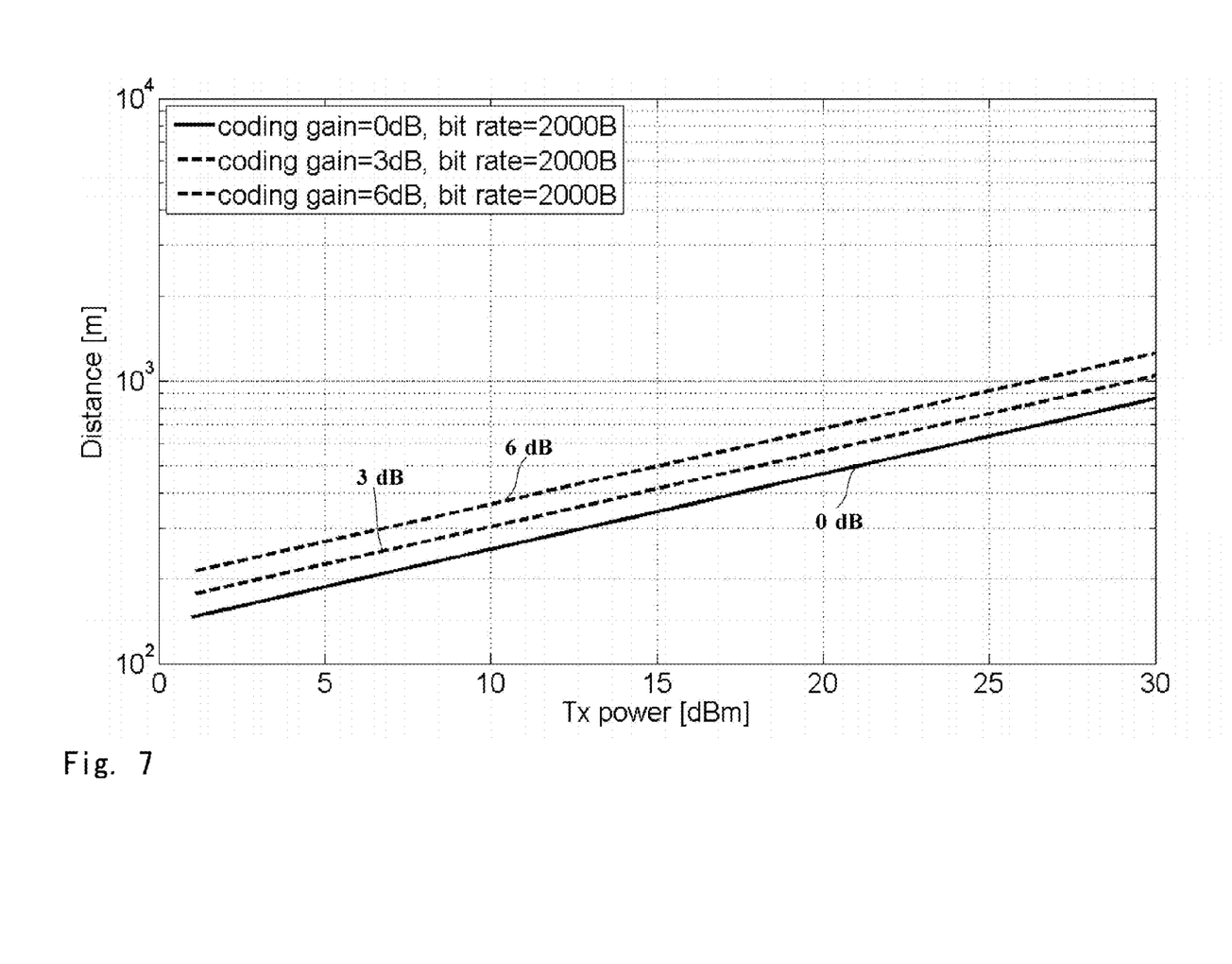
FIG. 7 shows the simulation results on transmission power vs distance (Tx-Rx) for different coding gains (0, 3, 6 dB)

Improvement of the bit error performance (BER) leads to expansion of the coverage area. FIG. 6 and FIG. 7 show the simulation results on transmission power vs distance (Tx-Rx) for different coding gains (0, 3, 6 dB).

Listed below are simulation parameters (Matlab).
tx_power=30 [dBm]
antenna_gain=3 [db] tx & rx
coding_gain=0, 3 or 6 [dB]
shadowing_std=8 [dB]
N0=−174 [dBm/Hz]
Noise_figure=7 [dB]
Bit_rate=20 or 2000 [kbps]
EbNo=4.5 (with convolutional coding at BER=1e-5)
i_loss=3 [dB] (implementation loss)
f_loss=3 [dB] (multipath fading loss)
a_height=15 [m] (antenna height)
frequency=900 [MHz] (carrier frequency)
Link budget (LB):

LB [dB]=TxPower+antenna gain+coding gain−(noise_variance+noise_figure+Eb/No+implementation loss+fading loss+10*log 10(bit rate*1000))

Bit rate=20 Byte in FIG. 6 and Bit rate=2000 Byte in FIG. 7. From FIG. 6 and FIG. 7, it is shown that 3 dB of performance improvement could increase coverage area by approximately 1.5 times.

Figure 8:
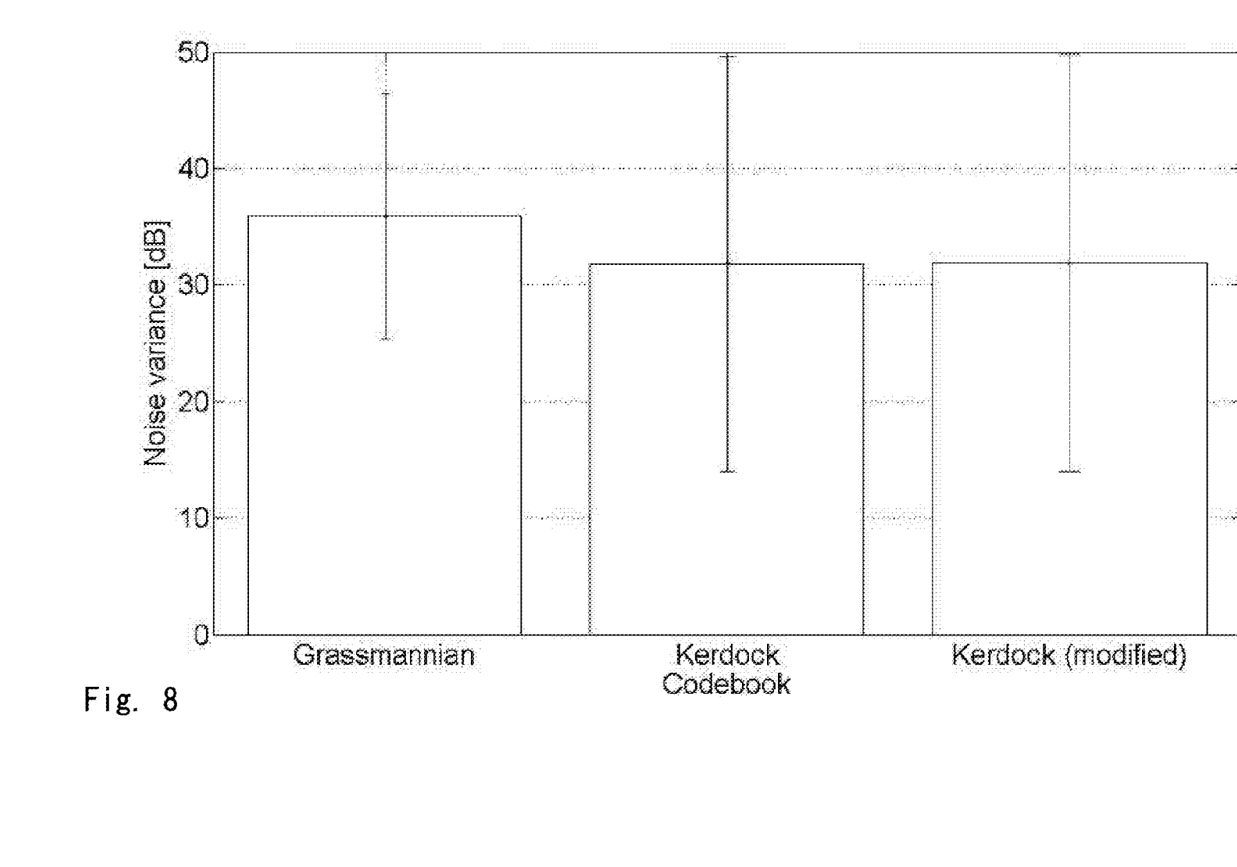
FIG. 8 shows the measured noise variance when different precoding codebooks are applied (the Grassmannian codebook, the (unmodified) Kerdock codebook and the modified Kerdock codebook)

Further, we would like to add an illustration about the measured noise variance. There is a difference in the observed noise variance between the Grassmannian codebook, the (unmodified) Kerdock codebook and the modified Kerdock codebook. FIG. 8 shows the measured noise variance when different precoding codebooks are applied (the Grassmannian codebook, the (unmodified) Kerdock codebook and the modified Kerdock codebook). The precoding using the (unmodified) Kerdock codebook reduces the observed noise variance compared to the Grassmannian codebook. This result could be expected because the (unmodified) Kerdock manifold is often used for error correction. We would like to emphasize that our proposed modifications on Kerdock codebook do not have negative effects on the observed noise variance.

As we described above, our proposed modification on the Kerdock manifold provides valuable results and when applying it as a precoder, practical benefits, for example, improvement of BER performance and expansion of the coverage area are achieved.

A Second Embodiment

Figure 9:
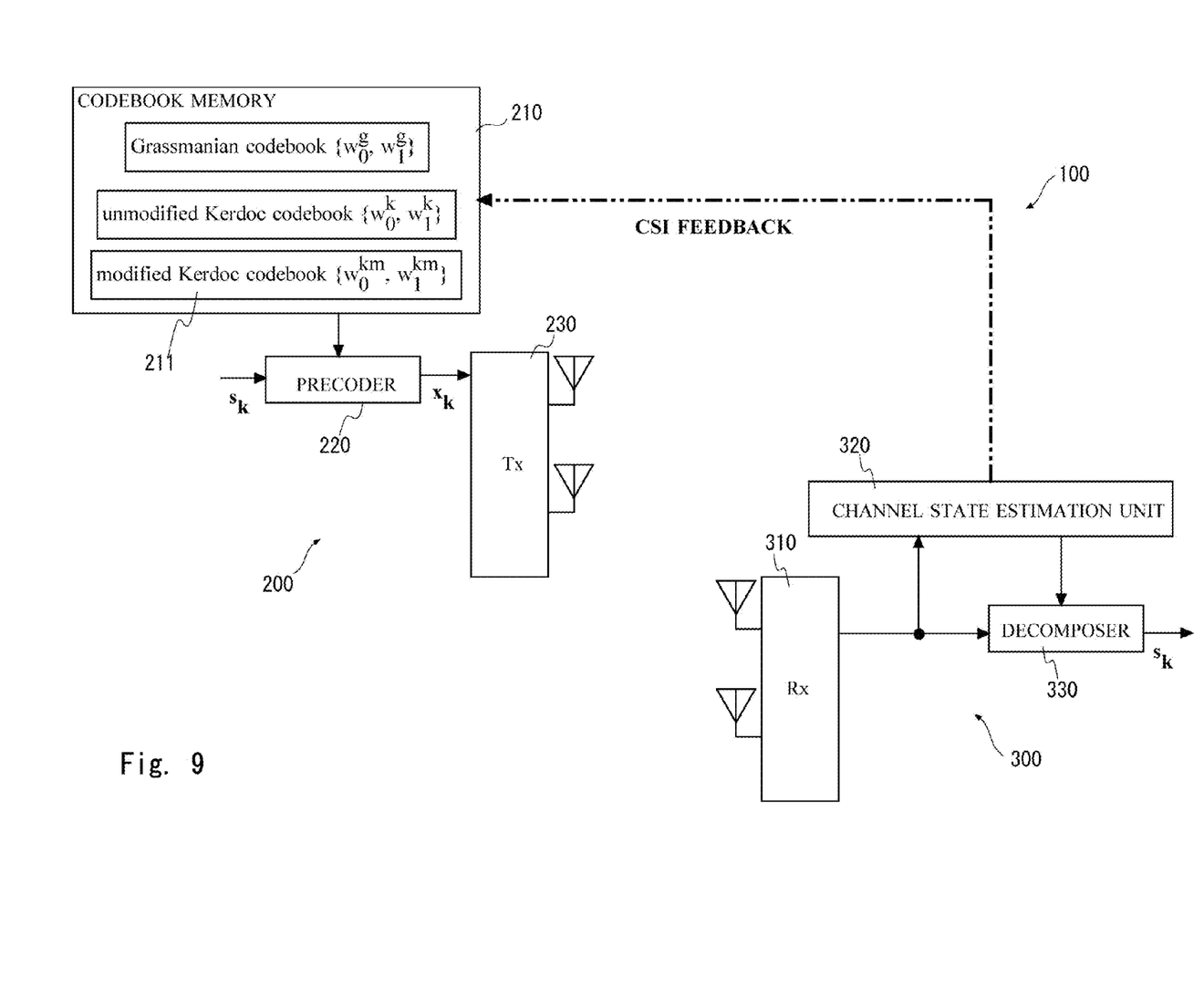
FIG. 9 shows a second embodiment.

The first embodiment described above used one codebook that was the modified Kerdock codebook. In a second embodiment, the Codebook memory stores various codebooks in addition to the modified Kerdock codebook and the most suitable codebook is dynamically selected. FIG. 9 shows the second embodiment in which the codebook memory includes the Grassmannian codebook, the Kerdock codebook and the modified Kerdock codebook. As is the same as the first embodiment, the channel state estimation unit calculates and estimates the channel state based on the received data, and searches for the most suitable codebook, more specifically, searches for the most suitable codeword for the current (estimated) channel state.

Since each of the codebook designs has unique advantages respectively, the most suitable codebook is changeable based on the surrounding environments or required properties. For example, when high data rate and/or indoor radio environment is required, the Grassmannian codebook would be the most suitable one. When long coverage area is required, the (unmodified) Kerdock codebook would be suitable, and furthermore, when much longer coverage is required, the best codebook would be the modified Kerdock codebook. In addition to the dynamic selection of the codebooks, the selection of the codebooks could be present at an installation stage by a person responsible for the installation of MIMO wireless communication system.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The present invention can be applied to a method and an apparatus for MIMO wireless communication systems. The invention enables the reliable transmission over long-range in wireless networks. In particular, the IEEE 802.11ah WLAN protocol requires new codebooks which are useful for outdoor long-range coverage. Our proposed precoding is a potential candidate for embodiments including but not limited to: WiMAX, IEEE 802.16m, 3GPP LTE, WLANs, WPANs (wireless personal area networks), WBANs (wireless body area networks). In wireless personal area networks (WPANs), such as IEEE 802.15.4 WPAN, protocols are used and implemented in sensor nodes. IEEE 802.15.4 WPAN sensors can use the invention to enhance the wireless coverage. New IEEE 802.15.4 WPAN standards also support multi-antenna systems, so that the invention can be easily applied to such systems. In addition, single users MIMO (SU-MIMO) as well as multi-user MIMO (MU-MIMO) are potential candidates of embodiment.

REFERENCE SIGNS LIST 100 wireless communication system
200 transmitter
300 receiver
210 codebook memory
220 precoder
230 transmitting circuit
310 receiving circuit
320 channel state estimation unit
330 decomposer

The invention claimed is:
1. A wireless communication apparatus comprising:
a codebook memory storing a prepared codebook composed of a plurality of codewords;
a precoder precoding signals by executing matrix multiplication of the signals to be sent and a selected codeword;
a transmitting circuit having a plurality of antennas;
wherein the codewords are expressed by the equation set forth below as a modified Kerdock manifold,

$$w_0^{km} = \frac{1}{\sqrt{2}}\begin{bmatrix} 1 & 1 \\ 1 & -1 \end{bmatrix} \qquad \text{[Equation 4]}$$

$$w_1^{km} = \frac{1}{\sqrt{2}}\begin{bmatrix} 1 & 1+j \\ 1+j & 1-j \end{bmatrix}.$$

2. The wireless communication apparatus according to claim 1, wherein the codebook memory further storing at least one of Grassmannian codebook and Kerdock codebook.

3. A wireless communication system having a transmitter and a receiver, the transmitter comprising:
a codebook memory storing a prepared codebook composed of a plurality of codewords;
a precoder precoding signals by executing matrix multiplication of the signals to be sent and a selected codeword, and
a transmitting circuit having a plurality of antennas,
wherein the codewords are expressed by the equation set forth below as a modified Kerdock manifold, $$w_0^{km} = \frac{1}{\sqrt{2}}\begin{bmatrix} 1 & 1 \\ 1 & -1 \end{bmatrix} \qquad \text{[Equation 5]}$$

$$w_1^{km} = \frac{1}{\sqrt{2}}\begin{bmatrix} 1 & 1+j \\ 1+j & 1-j \end{bmatrix}.$$

4. A method for wireless communication comprising:
precoding signals by executing matrix multiplication of the signals to be sent and a selected codeword;
transmitting the precoded signals from multi-antenna;
wherein the codewords are expressed by the equation set forth below as a modified Kerdock manifold, $$w_0^{km} = \frac{1}{\sqrt{2}}\begin{bmatrix} 1 & 1 \\ 1 & -1 \end{bmatrix} \qquad \text{[Equation 6]}$$

$$w_1^{km} = \frac{1}{\sqrt{2}}\begin{bmatrix} 1 & 1+j \\ 1+j & 1-j \end{bmatrix}.$$

* * * * *